US011878686B2

(12) United States Patent
Iihoshi et al.

(10) Patent No.: US 11,878,686 B2
(45) Date of Patent: Jan. 23, 2024

(54) DRIVING ASSISTANCE DEVICE

(71) Applicant: Hitachi Astemo, Ltd., Hitachinaka (JP)

(72) Inventors: Yoichi Iihoshi, Tokyo (JP); Takashi Okada, Tokyo (JP); Yuuki Okuda, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 343 days.

(21) Appl. No.: 17/283,390

(22) PCT Filed: Oct. 8, 2019

(86) PCT No.: PCT/JP2019/039576
§ 371 (c)(1),
(2) Date: Apr. 7, 2021

(87) PCT Pub. No.: WO2020/085072
PCT Pub. Date: Apr. 30, 2020

(65) Prior Publication Data
US 2021/0380108 A1    Dec. 9, 2021

(30) Foreign Application Priority Data
Oct. 26, 2018  (JP) .................................. 2018-201673

(51) Int. Cl.
*B60W 30/16*  (2020.01)
*B60W 30/18*  (2012.01)
(Continued)

(52) U.S. Cl.
CPC ...... *B60W 30/16* (2013.01); *B60W 30/18154* (2013.01); *B60W 40/04* (2013.01);
(Continued)

(58) Field of Classification Search
CPC ........... B60W 30/16; B60W 30/18154; B60W 40/04; B60W 50/0097; B60W 50/14; B60W 2552/05; B60W 2554/802
(Continued)

(56) References Cited

U.S. PATENT DOCUMENTS 10,019,011 B1 * 7/2018 Green ................... G05D 1/0088
11,254,211 B2 * 2/2022 Koebler ..................... G06F 7/00
(Continued)

FOREIGN PATENT DOCUMENTS

JP     2008-087545 A    4/2008
JP     2009-126433 A    6/2009
(Continued)

OTHER PUBLICATIONS

Japanese Office Action dated Oct. 4, 2022 for Japanese Patent Application No. 2018-201673.
(Continued)

*Primary Examiner* — Atul Trivedi
(74) *Attorney, Agent, or Firm* — Volpe Koenig (57) ABSTRACT

A driving assistance device controls the speed of an own vehicle based on a predicted traveling state of a preceding vehicle, and includes a traveling scene recognition unit that detects the distance until the preceding vehicle reaches an intersection, a determination unit that determines a traveling scene of the preceding vehicle at the intersection, and a calculation unit that selects the preceding vehicle prediction model according to the traveling scene determined by the determination unit from among a plurality of preceding vehicle prediction models recorded for each traveling scene in which the preceding vehicle travels, and inputs a distance until the preceding vehicle detected by the traveling scene recognition unit in the selected preceding vehicle prediction model reaches the intersection so as to calculate a predicted traveling state of the preceding vehicle after a predetermined time.

11 Claims, 6 Drawing Sheets

(51) Int. Cl.
  *B60W 40/04* (2006.01)
  *B60W 50/00* (2006.01)
  *B60W 50/14* (2020.01)

(52) U.S. Cl.
  CPC ........ *B60W 50/0097* (2013.01); *B60W 50/14* (2013.01); *B60W 2552/05* (2020.02); *B60W 2554/802* (2020.02)

(58) Field of Classification Search
  USPC .......................................................... 701/96
  See application file for complete search history.

(56) References Cited

U.S. PATENT DOCUMENTS

| | | | | |
|---|---|---|---|---|
| 2013/0046466 | A1* | 2/2013 | Yucel | G01C 21/3469 |
| | | | | 701/538 |
| 2013/0046526 | A1* | 2/2013 | Yucel | G01C 21/3469 |
| | | | | 703/8 |
| 2014/0032090 | A1 | 1/2014 | Ono | |
| 2015/0158486 | A1* | 6/2015 | Healey | B60W 30/16 |
| | | | | 701/23 |
| 2015/0168174 | A1* | 6/2015 | Abramson | G01C 21/3407 |
| | | | | 701/408 |
| 2015/0217775 | A1 | 8/2015 | Ono | |
| 2015/0302670 | A1* | 10/2015 | Ulrey | B60W 40/00 |
| | | | | 701/123 |
| 2016/0035150 | A1* | 2/2016 | Barfield, Jr. | G05B 23/0254 |
| | | | | 701/29.3 |
| 2016/0216130 | A1* | 7/2016 | Abramson | G01C 21/3423 |
| 2017/0294060 | A1* | 10/2017 | Lonski | B60W 50/14 |
| 2018/0003516 | A1* | 1/2018 | Khasis | G08G 1/207 |
| 2018/0075739 | A1* | 3/2018 | Ginsberg | G08G 1/096783 |
| 2018/0178839 | A1 | 6/2018 | Ide | |
| 2018/0261086 | A1* | 9/2018 | Su | G08G 1/095 |
| 2022/0096003 | A1* | 3/2022 | Mai | A61B 5/7253 |
| 2022/0244061 | A1* | 8/2022 | Mellinger | B60W 30/1882 |

FOREIGN PATENT DOCUMENTS

| | | | | |
|---|---|---|---|---|
| JP | 2014-026539 | A | 2/2014 | |
| JP | 2015-005225 | A | 1/2015 | |
| JP | 2016-047701 | A | 4/2016 | |
| JP | 2018-024360 | A | 2/2018 | |
| JP | 2018-103862 | A | 7/2018 | |
| WO | 2014/045355 | A1 | 3/2014 | |
| WO | WO-2016127918 | A1 * | 8/2016 | ............. G06Q 10/02 |
| WO | WO-2017202947 | A2 * | 11/2017 | ............. F01N 9/007 |
| WO | WO-2023023214 | A1 * | 2/2023 | |

OTHER PUBLICATIONS

Japanese Office Action dated Mar. 7, 2023 for Japanese Patent Application No. 2018-201673 .
International Search Report and English Translation, PCT/JP2019/039576, dated Jan. 28, 2020 (4 pgs.).

* cited by examiner

| NO | INTERSECTION TYPE |
|---|---|
| 1 | THREE-WAY INTERSECTION |
| 2 | FOUR-WAY INTERSECTION |
| 3 | FIVE-WAY INTERSECTION |
| 4 | ROUNDABOUT |
| 5 | STAGGERED INTERSECTION |
| 6 | SCRAMBLED INTERSECTION |
| 7 | THREE-DIMENSIONAL INTERSECTION |

FIG. 6

| NO | PRECEDING VEHICLE TRAVELING STATE (CURRENT) | PRECEDING VEHICLE TRAVELING STATE (PREDICTION) | FUEL-SAVING DRIVING CONTROL |
|---|---|---|---|
| 1 | CRUISING | DECELERATION | EARLY DECELERATION (ENGINE-BRAKE DECELERATION) |
| 2 | ACCELERATION | DECELERATION | SLOW TRACKING (SLOW ACCELERATION → ENGINE-BRAKE DECELERATION) |
| 3 | DECELERATION | ACCELERATION | SLOW TRACKING (ENGINE-BRAKE DECELERATION → SLOW ACCELERATION) |

DRIVING ASSISTANCE DEVICE

TECHNICAL FIELD

The present invention relates to a driving assistance technique for controlling the speed of an own vehicle based on a predicted traveling state of a preceding vehicle.

BACKGROUND ART

For the purpose of avoiding accidents or improving convenience, the introduction of driving assistance technology that assists or automates driver's accelerator and brake operations is progressing. In these technologies, a vehicle control device recognizes the traveling situation based on information detected by an environment detection sensor obtained from the in-vehicle camera, radar, and the like, and controls a power train device such as engine and motor and a braking device. The driving assistance technology is not limited to this, and in recent years, a driving assistance technology that realizes fuel-saving driving based on a predicted traveling state of the preceding vehicle traveling in front of the own vehicle has been studied. For example, a technique for predicting the traveling state of the preceding vehicle based on the driving characteristics of the driver of the preceding vehicle (PTL 1) and a technique for predicting the vehicle behavior corresponding to the current traffic condition (PTL 2) are disclosed.

CITATION LIST

Patent Literature

PTL 1: JP 2008-87545 A
PTL 2: JP 2014-26539 A

SUMMARY OF INVENTION

Technical Problem

However, in PTL 1, it is not considered that, when the situation at the time of creating the prediction model for predicting the traveling state of the preceding vehicle (learning data set) and the current situation (input data set) are different, the prediction accuracy is significantly worse. Further, although PTL 2 discloses a technique for selecting the most appropriate prediction model based on the characteristics of time-series changes, the corresponding range of the prediction model is not considered. For this reason, when the fuel-saving driving control is executed by the conventional prediction technique, the fuel-saving driving control is executed in a situation not assumed by the prediction model, and there is a concern that the prediction is wrong and the fuel consumption is deteriorated.

The invention has been made in view of the above problems, and an object thereof is to provide a technique capable of improving fuel efficiency.

Solution to Problem

In order to solve the above problems, a driving assistance device according to the invention controls a speed of an own vehicle based on a predicted traveling state of a preceding vehicle, and includes a reach distance detection unit that detects a distance until the preceding vehicle reaches a predetermined point ahead, a determination unit that determines a traveling scene at the predetermined point ahead of the preceding vehicle, and a calculation unit that selects a prediction model according to the traveling scene determined by the determination unit from among a plurality of prediction models recorded for each traveling scene in which the preceding vehicle travels, and inputs a distance until the preceding vehicle detected by the reach distance detection unit in the selected prediction model reaches the predetermined point ahead so as to calculate a traveling state of the preceding vehicle after a predetermined time.

Advantageous Effects of Invention

According to the invention, fuel efficiency can be improved.

DESCRIPTION OF EMBODIMENTS

Figure 1:
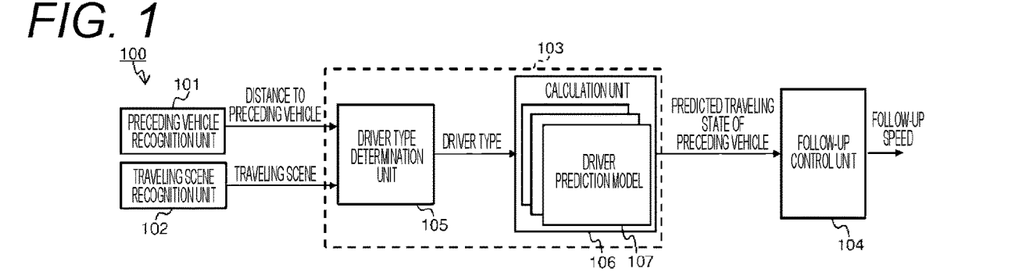
FIG. 1 is a block diagram illustrating a conventional driving assistance device.

First, the problems of a conventional driving assistance device will be described with reference to FIGS. 1 and 2.
FIG. 1 is a block diagram illustrating the conventional driving assistance device.
The driving assistance device 100 includes a preceding vehicle recognition unit 101, a traveling scene recognition unit 102, a prediction unit 103, and a follow-up control unit 104. The preceding vehicle recognition unit 101 is a radar or a camera, calculates the distance from the own vehicle to a preceding vehicle and the speed of the preceding vehicle, and outputs the calculated distance from the own vehicle to the preceding vehicle and the speed of the preceding vehicle to the prediction unit 103. The traveling scene recognition unit 102 has a GPS receiver and a map, calculates a predetermined traveling scene (for example, a slope, a curve, a speed limit change point) of the preceding vehicle that is always accompanied by acceleration/deceleration, and outputs the calculated traveling scene to the prediction unit 103.

The prediction unit 103 includes a driver type determination unit 105 and a calculation unit 106. The driver type determination unit 105 determines the driver type based on the magnitude and frequency of acceleration when the vehicle accelerates or decelerates in a predetermined traveling scene of the preceding vehicle. The driver type may be a leisurely type, a normal type, an impatient type, or the like. The calculation unit 106 selects the driver prediction model 107 according to the driver type determined by the driver type determination unit 105 from a plurality of driver prediction models 107 recorded for each driver type. Then, the calculation unit 106 inputs the distance from the own vehicle to the preceding vehicle into the selected driver prediction model 107, so that the predicted traveling state of the preceding vehicle after a predetermined time (speed information after a predetermined time) is output.

The follow-up control unit 104 calculates a follow-up speed of the own vehicle with respect to the preceding vehicle according to the predicted traveling state of the preceding vehicle. In this way, the driving assistance device 100 can control the follow-up speed of the own vehicle based on the calculated predicted traveling state, and reduce the deterioration of fuel consumption that occurs when following the useless acceleration/deceleration of the preceding vehicle.

Figure 2:
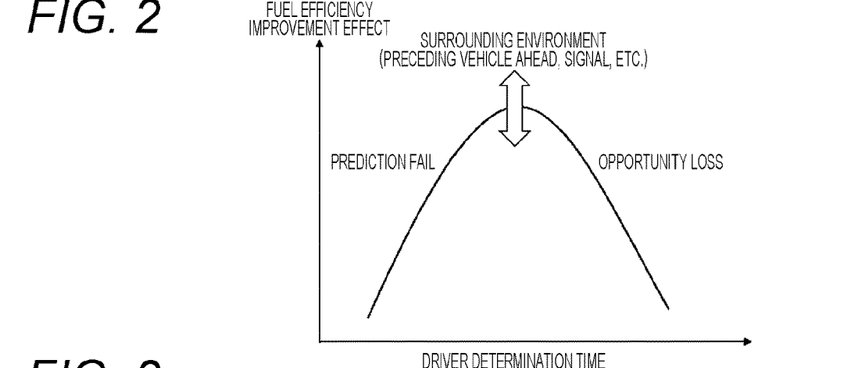
FIG. 2 is an explanatory diagram of problems of the conventional driving assistance device.

FIG. 2 is an explanatory diagram of problems of the conventional driving assistance device.

In the fuel-saving speed control by the conventional driving assistance device 100, the time required to determine the driver type of each preceding vehicle (driver type determination time) becomes a problem. That is, if the driver type determination time is too short, the probability of erroneous driver type determination increases, and when the predicted traveling state of the preceding vehicle is calculated using the incorrect driver prediction model, the effect of fuel efficiency improvement during fuel-saving driving control is reduced. On the contrary, if the driver type determination time is too long, the time (opportunity loss) until the fuel-saving driving control is executed increases, and the effect of improving the fuel consumption cannot be sufficiently obtained. Since the traveling state of the preceding vehicle depends on uncertain factors for each surrounding environment such as preceding vehicles ahead and the signals, it is actually even more difficult thing to uniquely determine the driver type determination time.

<First Embodiment>

Therefore, in this embodiment, the preceding vehicle prediction model for each traveling scene is used instead of the driver prediction model. In the following description, for the sake of simplicity, the traveling scene is limited to an intersection as an example of a "predetermined point ahead". However, in addition to intersections, traveling scenes such as curves, slopes, and speed limit change points may be used, or combinations thereof may be used.

The first embodiment will be described with reference to FIGS. 3 to 10.

Figure 3:
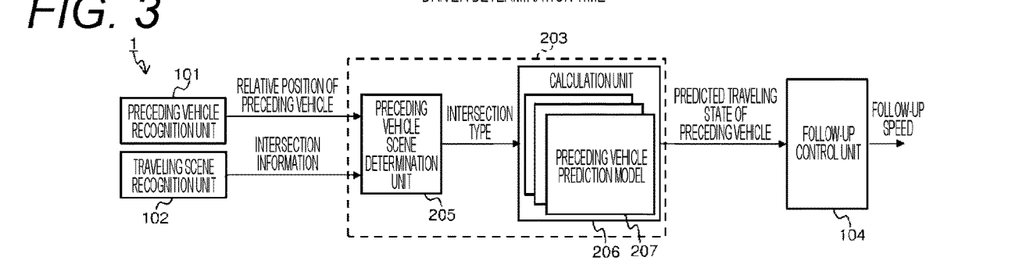
FIG. 3 is a block diagram illustrating a driving assistance device according to a first embodiment.

FIG. 3 is a block diagram illustrating a driving assistance device according to the first embodiment.

The driving assistance device 1 includes a preceding vehicle recognition unit 101 as an example of a "speed detection unit", a traveling scene recognition unit 102 as an example of a "reach distance detection unit", a prediction unit 203, a follow-up control unit 104.

The preceding vehicle recognition unit 101 is a radar or a camera. The preceding vehicle recognition unit 101 calculates the relative position of the preceding vehicle with respect to the own vehicle and the speed of the preceding vehicle, and outputs the calculated relative position of the preceding vehicle with respect to the own vehicle and the calculated speed of the preceding vehicle to the prediction unit 203. The traveling scene recognition unit 102 is a GPS receiver and a map. The traveling scene recognition unit 102 calculates the intersection information (intersection distance, number of branches, branch angle, number of lanes) and the distance from the preceding vehicle to the intersection, and outputs the determined distance from the preceding vehicle to the intersection to the prediction unit 203.

The prediction unit 203 includes a preceding vehicle scene determination unit 205 as an example of the "determination unit" and a calculation unit 206. The preceding vehicle scene determination unit 205 determines the intersection type (crossroads, T-junction, presence/absence of a signal, etc.) through which the preceding vehicle passes, based on the relative position of the preceding vehicle with respect to the own vehicle and the intersection information. The calculation unit 206 selects the preceding vehicle prediction model 207 according to the intersection type determined by the preceding vehicle scene determination unit 205 from the plurality of preceding vehicle prediction models 207 recorded for each intersection type in which the preceding vehicle travels. Then, the calculation unit 206 inputs the distance from the preceding vehicle to the intersection and the speed of the preceding vehicle into the selected preceding vehicle prediction model 207, so that the predicted traveling state of the preceding vehicle after a predetermined time (speed information after a predetermined time) is output.

The follow-up control unit 104 calculates a follow-up speed of the own vehicle with respect to the preceding vehicle according to the predicted traveling state of the preceding vehicle. In this way, the driving assistance device 1 can control the speed of the own vehicle based on the calculated predicted traveling state, and can reduce the deterioration of fuel consumption caused by following the unnecessary acceleration/deceleration of the preceding vehicle. In this configuration, fuel-saving driving control based on the predicted traveling state according to the intersection type can be quickly and surely executed even at an intersection where acceleration/deceleration does not always occur.

Figure 4:
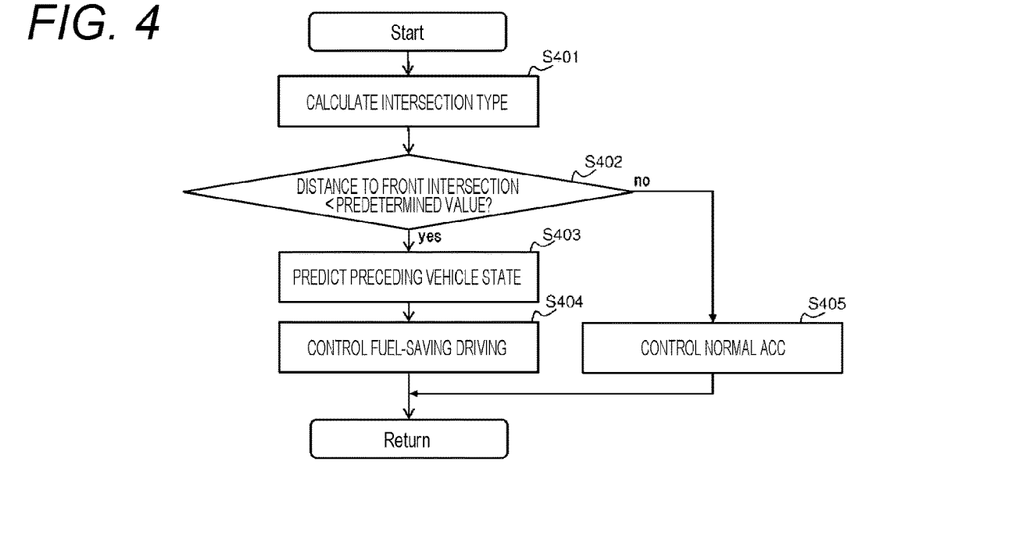
FIG. 4 is a flowchart of driving assistance control according to the first embodiment.

FIG. 4 is a flowchart of the driving assistance control according to the first embodiment.

The preceding vehicle scene determination unit 205 matches the map with the position of the own vehicle, and calculates whether the intersection ahead of the preceding vehicle is one of a plurality of pre-registered intersection types (S401). The preceding vehicle scene determination unit 205 determines whether the distance until the preceding vehicle reaches the front intersection is smaller than a predetermined value (S402). In a case where the determination result in S402 is true (S402: YES), the process proceeds to Step S403. The calculation unit 206 calculates the predicted traveling state of the preceding vehicle by using the preceding vehicle prediction model according to the calculated intersection type (S403). The follow-up control unit 104 calculates the own vehicle speed for executing the fuel-saving driving control based on the predicted traveling state (S404).

On the other hand, when the determination result of S402 is false (S402: NO), the driving assistance device 1 proceeds to Step 5405 and performs normal ACC control. The driving assistance device 1 executes fuel-saving driving control based on the predicted traveling state of the preceding vehicle only when the distance from the preceding vehicle to the front intersection is smaller than a predetermined value. This predetermined value does not necessarily have to be constant, and may be a speed table of the preceding vehicle, or may be a different value or table depending on the intersection type.

In any case, according to this configuration, the driving assistance device 1 can select the preceding vehicle prediction model 207 according to the intersection type at an appropriate timing, and can improve fuel efficiency.

Figure 5:
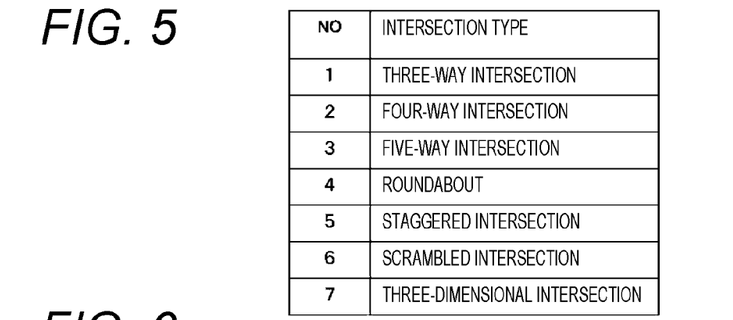
FIG. 5 is a configuration diagram of an intersection type table according to the first embodiment.

FIG. 5 is a configuration diagram of an intersection type table according to the first embodiment.

The preceding vehicle scene determination unit 205 records an intersection type table in which the intersection type is set according to the intersection shape, and the calculation unit 206 records the preceding vehicle prediction model 207 for each intersection shape. The intersection type table may include, as an item value (or column value; the same applies hereinafter), three-way intersections, four-way intersections, five-way intersections, roundabouts, staggered intersections, scrambled intersections, and three-dimensional intersections. The intersection type can be easily calculated based on the traveling direction of the preceding vehicle and the position on the map of the preceding vehicle (calculated from the position on the map of the own vehicle and the relative position of the preceding vehicle). Therefore, the calculation unit 206 can quickly select the preceding vehicle prediction model 207 when the preceding vehicle approaches the intersection. Further, the calculation unit 206 can predict a deceleration pattern of the preceding vehicle that differs for each intersection type, and can realize fuel-saving driving control based on higher prediction accuracy.

Figure 6:
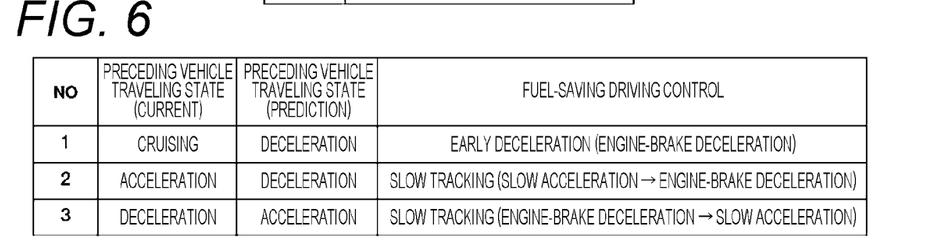
FIG. 6 is a configuration diagram of a fuel-saving control table according to the first embodiment.

FIG. 6 is a configuration diagram of the fuel-saving control table according to the first embodiment.

The calculation unit 206 records the fuel-saving control table indicating the relationship between the traveling state of the preceding vehicle and the fuel-saving control. As illustrated in FIG. 6, the calculation unit 206 executes fuel-saving driving control by decelerating with the engine brake in an early step (hereinafter, referred to as "engine-brake") even if the current traveling state (cruising, deceleration, acceleration, stop) of the preceding vehicle is a cruising state, the predicted traveling state of the preceding vehicle is deceleration. Alternatively, the calculation unit 206 loosens the degree of follow-up to the preceding vehicle when the current traveling state of the preceding vehicle is accelerating or decelerating and the predicted traveling state of the preceding vehicle is the opposite deceleration or acceleration respectively, so the deterioration of fuel consumption at the time of following the preceding vehicle can be reduced. Further, the current traveling state of the preceding vehicle can be calculated by changing the speed of the preceding vehicle within a predetermined time. For example, if the speed change after 5 seconds is larger than +2 m/s, it will be accelerated. If the speed is smaller than −2 m/s, it will be decelerated. If the preceding vehicle speed is 1 m/s or less, it will be stopped. In other cases, it may be cruising. In this way, by setting the traveling state of the preceding vehicle instead of the preceding vehicle speed, fuel-saving control based on the preceding vehicle prediction state can be realized by the following simple method.

Figure 7:
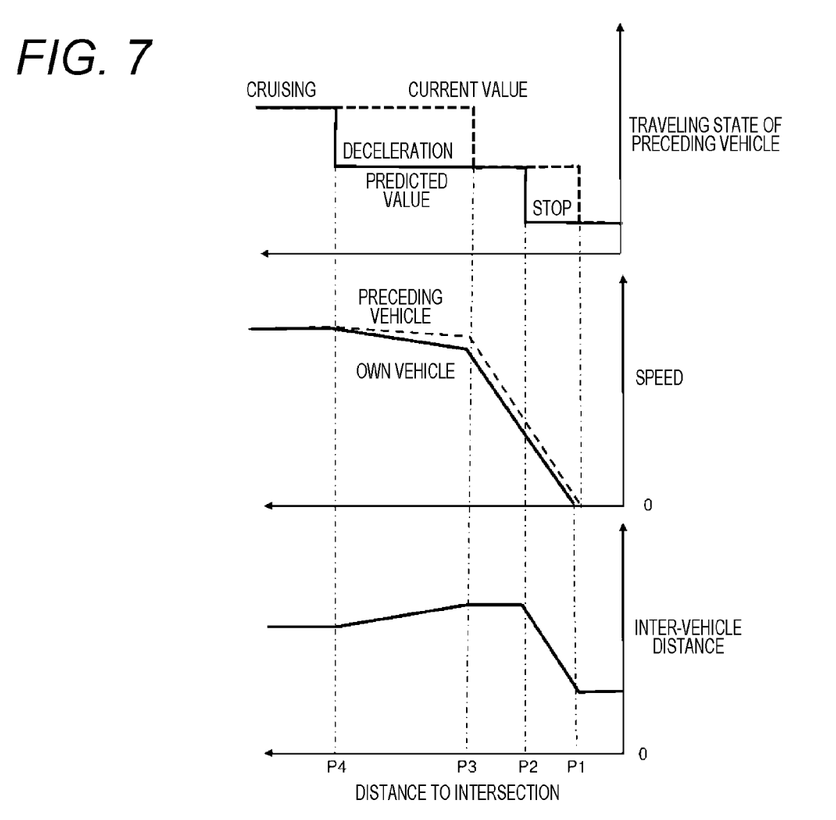
FIG. 7 is an explanatory diagram of early deceleration control according to the first embodiment.

FIG. 7 is an explanatory diagram of early deceleration control according to the first embodiment.

An intersection distance P4 is a position where the predicted traveling state of the preceding vehicle is decelerated, and from this position, the target vehicle speed of the own vehicle is reduced by the amount of engine-brake deceleration (in the case of an electric vehicle, the amount of inertia deceleration) from the current value. As a result, the speed of the own vehicle is smaller than that of the preceding vehicle, and the inter-vehicle distance between the own vehicle and the preceding vehicle is increased. Next, an intersection distance P3 is the point where the current traveling state of the preceding vehicle has turned to deceleration, and the speed of the own vehicle is calculated from this position so that the inter-vehicle distance between the own vehicle and the preceding vehicle is kept constant.

An intersection distance P2 is the point where the predicted traveling state of the preceding vehicle has stopped. From this position, the speed of the own vehicle is calculated so as to realize the inter-vehicle distance between the own vehicle and the preceding vehicle when the preceding vehicle is stopped, and the vehicle stops at an intersection distance P1 farther from the intersection than the stop position of the preceding vehicle. The driving assistance device 1 preferably includes a notification unit for notifying the driver of the own vehicle that it is in the fuel-saving driving control in which the speed of the own vehicle is intentionally controlled between the intersection point P4 and the intersection point P3 to separate the inter-vehicle distance between the own vehicle and the preceding vehicle. As a result, it is possible to prevent the driver from feeling anxious about changes in the inter-vehicle distance between the own vehicle and the preceding vehicle and deceleration.

Figure 8:
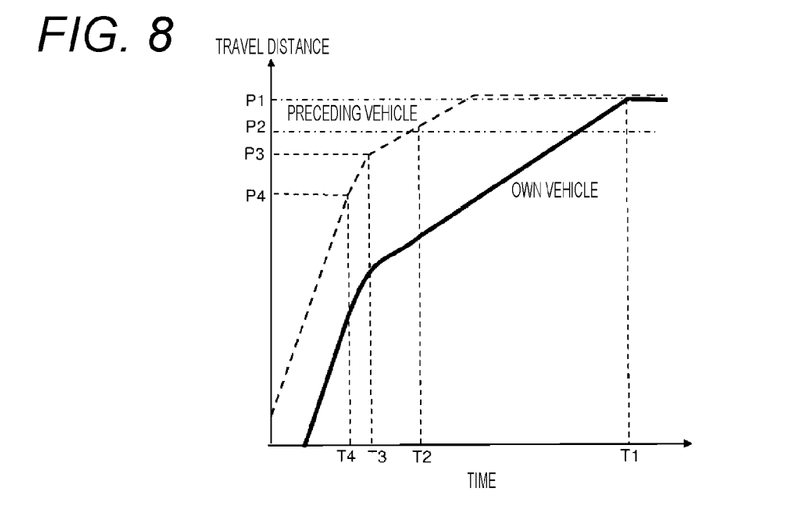
FIG. 8 is an explanatory diagram of the relationship between time and mileage during early deceleration control according to the first embodiment.

FIG. 8 is an explanatory diagram of the relationship between the time and the mileage during the early deceleration control according to the first embodiment.

P1 to P4 in FIG. 8 correspond to P1 to P4 in FIG. 7, and the difference in mileage between the preceding vehicle and the own vehicle when viewed from the time axis in FIG. 8 corresponds to the inter-vehicle distance between the own vehicle and the preceding vehicle of FIG. 7.

The line segment inclination in FIG. 8 is the vehicle speed. According to the early deceleration control, fuel-saving driving can be realized by running a long distance at a lower speed (small inclination) than the preceding vehicle from time T4 to T1.

Figure 9:
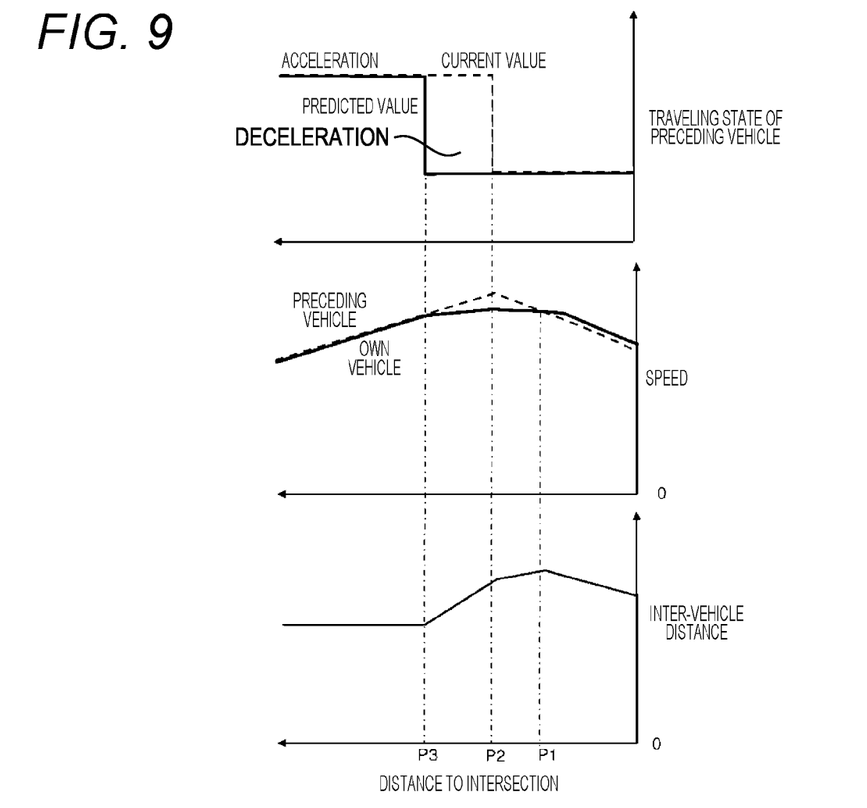
FIG. 9 is an explanatory diagram of slow tracking control according to the first embodiment.

FIG. 9 is an explanatory diagram of slow tracking control according to the first embodiment.

The intersection distance P3 is a position where the predicted value of the traveling state of the preceding vehicle is decelerated, and the driving assistance device 1 sets the speed of the own vehicle lower than that of the preceding vehicle from this position. The intersection distance P2 is a position where the traveling state of the preceding vehicle has turned to deceleration, and the driving assistance device 1 controls to keep the speed of the own vehicle constant from this position to the intersection distance P1 where the speed of the preceding vehicle is lower than the own vehicle speed. Therefore, according to the slow tracking control, the inter-vehicle distance between the own vehicle and the preceding vehicle increases between points P3 and P2. Therefore, as in the case of early deceleration control, it is preferable that the driving assistance device 1 includes a notification unit for notifying the driver that it is in the fuel-saving driving in which the speed of the own vehicle is intentionally controlled to separate the inter-vehicle distance between the own vehicle and the preceding vehicle.

Figure 10:
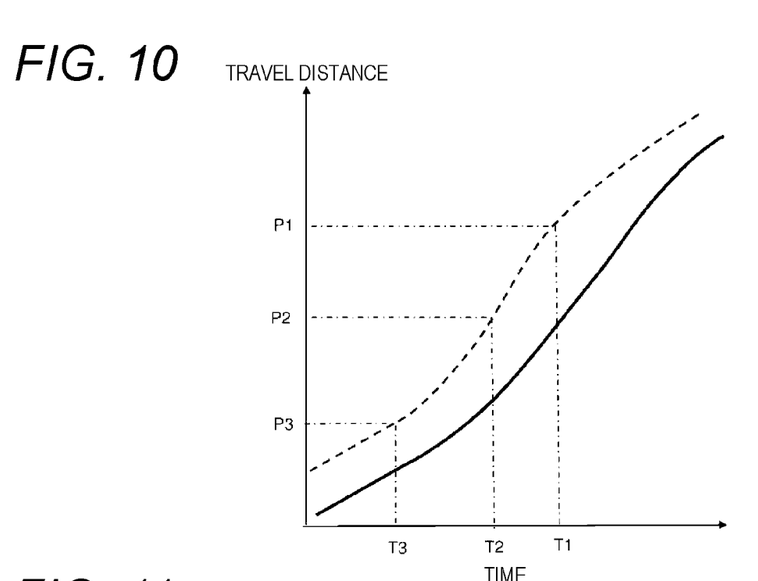
FIG. 10 is an explanatory diagram of the relationship between time and mileage during slow tracking control according to the first embodiment.

FIG. 10 is an explanatory diagram of the relationship between the time and the mileage during the slow tracking control according to the first embodiment.

P1 to P3 in FIG. 10 correspond to P1 to P3 in FIG. 8, respectively. According to the slow tracking control, fuel-saving driving is realized by suppressing the speed between T3 and T1, in which the preceding vehicle accelerates and decelerates, low.

As described above, in this embodiment, an appropriate preceding vehicle prediction model can be selected even at an intersection immediately after the preceding vehicle is detected, and fuel-saving driving can be realized by appropriately controlling the speed of the own vehicle with respect to the preceding vehicle.

<Second Embodiment>

Another embodiment of the invention will be described with reference to FIGS. 11 to 14.

Figure 11:
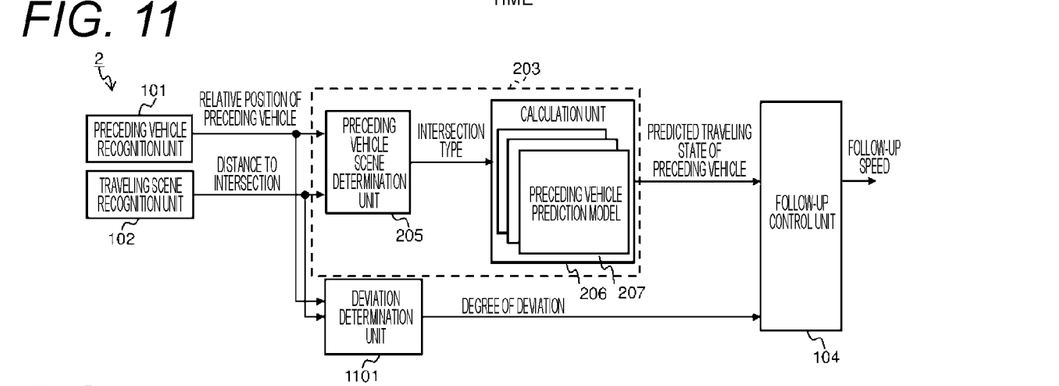
FIG. 11 is a block diagram illustrating a driving assistance device according to a second embodiment.

FIG. 11 is a block diagram illustrating a driving assistance device according to the second embodiment.

A driving assistance device 2 according to the second embodiment is different from the driving assistance device 1 according to the first embodiment in FIG. 3 in that a deviation determination unit 1101 is provided to determine whether the preceding vehicle prediction model 207 can be applied from the input to the preceding vehicle scene determination unit 205. Other configurations are the same as those of the driving assistance device 1 according to the first embodiment. Therefore, the differences from the first embodiment will be mainly described.

The driving assistance device 2 includes the deviation determination unit 1101 that records a deviation model. The deviation determination unit 1101 calculates the degree of deviation indicating a deviation extent between the input (travel history) assumed by the preceding vehicle prediction model 207 recorded for each traveling scene in which the preceding vehicle travels and the actual input. Then, the follow-up control unit 104 calculates the follow-up speed for realizing fuel-saving driving based on the predicted state only when the degree of deviation is smaller than a predetermined value. According to this configuration, when the input to the preceding vehicle prediction model 207 is different from the assumption, the follow-up control can be prohibited and the deterioration of fuel consumption due to the prediction failure can be prevented.

Figure 12:
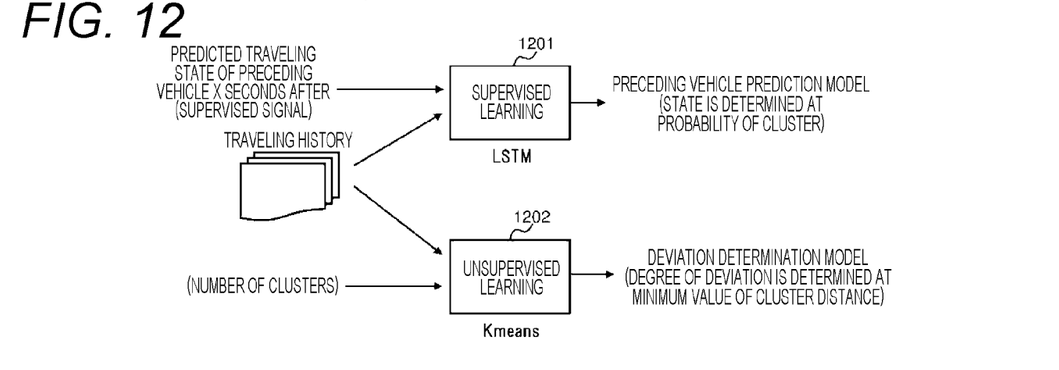
FIG. 12 is an explanatory diagram of a preceding vehicle prediction model and a deviation determination model according to the second embodiment.

FIG. 12 is an explanatory diagram of the preceding vehicle prediction model and the deviation determination model according to the second embodiment.

In the following, a method of constructing the preceding vehicle prediction model 207 and a deviation determination model as an example of the "deviation model" will be described using machine learning. However, supervised learning (for example, LSTM: Long Short Term Memory) 1201 is used to generate the preceding vehicle prediction model 207 using the travel history when passing through a specific intersection type (for example, a crossroad). The travel history at that time is assumed to include at least the speed of the preceding vehicle and the distance until the preceding vehicle reaches the intersection (preceding vehicle intersection distance), and as a supervised signal, the future preceding vehicle state (for example, decelerating if the speed displacement 5 seconds ahead is 2 m/s or more) is applied to the LSTM. As a result, it is possible to construct the preceding vehicle prediction model 207 that predicts the deceleration of the preceding vehicle in the future.

On the other hand, the deviation determination model can be constructed using unsupervised learning (for example, k-means) 1202 using the same data. Further, the deviation determination model may be prepared for all intersection types. However, it is possible to consolidate into one model by giving k-means all the inputs when creating the LSTM corresponding to each intersection type. In this embodiment, a cluster model is constructed by the unsupervised learning 1202 using the same data as when constructing and verifying the preceding vehicle prediction model 207, and the distance from the cluster that best matches the new input is adopted as the degree of deviation. As a result, when the calculated degree of deviation from the input of the preceding vehicle prediction model 207 is large, it can be quickly determined that the preceding vehicle prediction model 207 is unexpected.

Figure 13:
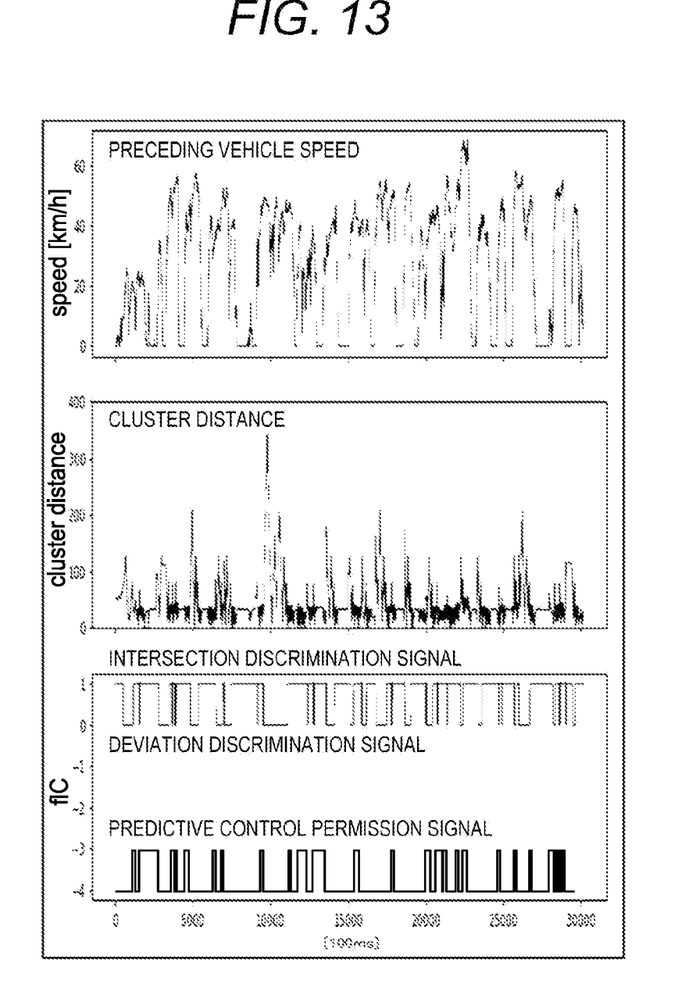
FIG. 13 is an explanatory diagram of a deviation determination result by the deviation determination model according to the second embodiment.

FIG. 13 is an explanatory diagram of the deviation determination result by the deviation determination model according to the second embodiment.

The uppermost stage in FIG. 13 is the speed of the preceding vehicle, the second stage is the result of calculating the distance to the nearest cluster by k-means (cluster distance), and the third stage is an intersection discrimination signal, a deviation discrimination signal, and a predictive control permission signal. In this example, the preceding vehicle prediction model 207 receives acceleration/deceleration in front/rear and left/right of the preceding vehicle, a brake lamp detection signal of the preceding vehicle, presence/absence of a preceding vehicle ahead, etc. in addition to the distance until the preceding vehicle reaches the intersection. Further, the deviation discrimination signal is set to be High when the cluster distance is smaller than a predetermined value, and the predictive control permission signal is the result of AND processing between the intersection discrimination signal and the deviation discrimination signal. By executing fuel-saving driving based on the predicted traveling state only when the predictive control permission signal is High, it is possible to prevent deterioration of fuel consumption even when an unexpected value is input to the preceding vehicle prediction model 207.

Figure 14:
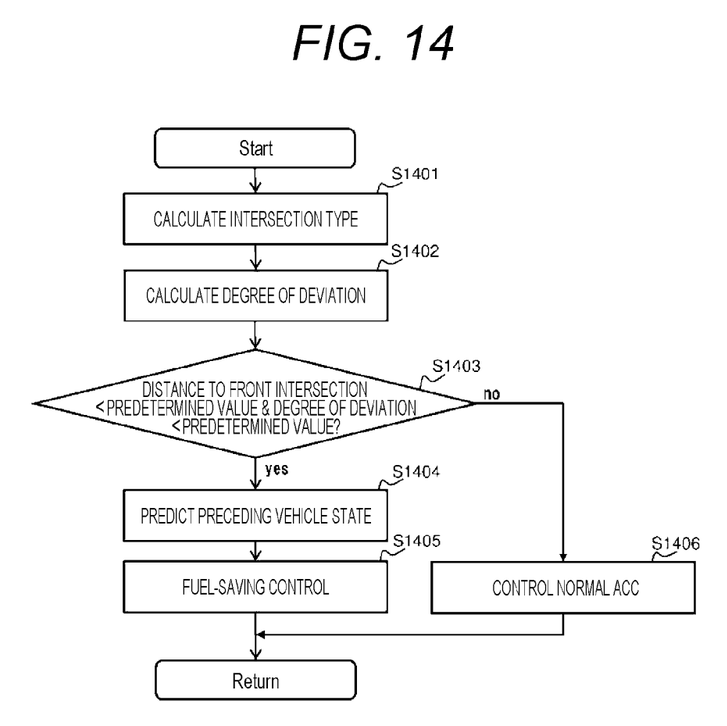
FIG. 14 is a flowchart of driving assistance control according to the second embodiment.

FIG. 14 is a flowchart of driving assistance control according to the second embodiment.

The preceding vehicle scene determination unit 205 matches the map with the position of the own vehicle, and calculates whether the intersection ahead of the preceding vehicle is one of a plurality of pre-registered intersection types (S1401). The deviation determination unit 1101 calculates the degree of deviation using the above-mentioned deviation determination model (S1402). The preceding vehicle scene determination unit 205 determines whether the distance until the preceding vehicle reaches the front intersection is smaller than a predetermined value and the degree of deviation is smaller than a predetermined value (S1403). In a case where the determination result in S1403 is true (S1403: YES), the process proceeds to Step S1404. The calculation unit 206 calculates the predicted traveling state of the preceding vehicle by using the preceding vehicle prediction model 207 according to the calculated intersection type (S1404). The follow-up control unit 104 calculates the own vehicle speed for executing the fuel-saving driving control based on the predicted traveling information (S1405). On the other hand, when the determination result of S1403 is false (S1403: NO), the driving assistance device 2 proceeds to Step S1406 and performs normal ACC control.

According to this embodiment, when a value not assumed by the preceding vehicle prediction model 207 is input, the fuel-saving driving control is prohibited, so that it is possible to prevent the deterioration of fuel consumption due to the fuel-saving driving control when the prediction information is deviated.

For example, the following expressions can be made based on the embodiments described so far.

<Expressions>

A driving assistance method for controlling a speed of an own vehicle based on a predicted traveling state of a preceding vehicle, includes:

- detecting a distance until the preceding vehicle reaches a predetermined point ahead;
- determining a traveling scene of the preceding vehicle at a predetermined point ahead (S401); and
- calculating a predicted traveling state of the preceding vehicle after a predetermined time by selecting a prediction model according to the traveling scene determined by the determination unit from among a plurality of prediction models recorded for each traveling scene in which the preceding vehicle travels and by inputting a distance until the preceding vehicle detected by the reach distance detection unit in the selected prediction model reaches the predetermined point ahead (S402, S403).

REFERENCE SIGNS LIST 1 driving assistance device
2 driving assistance device
101 preceding vehicle recognition unit
102 traveling scene recognition unit
205 preceding vehicle scene determination unit
206 calculation unit
207 preceding vehicle prediction model
1101 deviation determination unit

The invention claimed is:

1. A driving assistance device for controlling a speed of an own vehicle based on a predicted traveling state of a preceding vehicle, comprising:
 - a reach distance detection unit that detects a distance until the preceding vehicle reaches a predetermined point ahead;
 - a determination unit that determines a traveling scene at the predetermined point ahead of the preceding vehicle; and
 - a calculation unit that selects a prediction model according to the traveling scene determined by the determination unit from among a plurality of prediction models recorded for each traveling scene in which the preceding vehicle travels, and inputs a distance until the preceding vehicle detected by the reach distance detection unit in the selected prediction model reaches the predetermined point ahead so as to calculate a predicted traveling state of the preceding vehicle after a predetermined time.

2. The driving assistance device according to claim 1, wherein the predetermined point ahead is an intersection, the driving assistance device further comprising:
 - a speed detection unit that detects a speed of the preceding vehicle,
 - wherein the calculation unit inputs a distance until the preceding vehicle detected by the reach distance detection unit reaches the intersection, and the speed of the preceding vehicle detected by the speed detection unit to the prediction model so as to calculate a predicted traveling state of the preceding vehicle after a predetermined time.

3. The driving assistance device according to claim 2, wherein the calculation unit records a plurality of the prediction models for each type of the intersection.

4. The driving assistance device according to claim 1, wherein, when the predicted traveling state of the preceding vehicle is deceleration, fuel-saving driving for reducing a speed of the own vehicle is executed.

5. The driving assistance device according to claim 1, wherein, when the predicted traveling state of the preceding vehicle is acceleration, fuel-saving driving for maintaining or increasing a speed of the own vehicle is executed.

6. The driving assistance device according to claim 1, wherein, when the predicted traveling state of the preceding vehicle is cruising, fuel-saving driving for maintaining a speed of the own vehicle is executed.

7. The driving assistance device according to claim 4, further comprising:
 - a deviation determination unit that records a deviation model for calculating a degree of deviation from a travel history of the preceding vehicle,
 - wherein the deviation determination unit executes the fuel-saving driving when the degree of deviation is less than a predetermined value.

8. The driving assistance device according to claim 5, wherein the deviation determination unit prohibits the fuel-saving driving when the degree of deviation is equal to or higher than a predetermined value.

9. The driving assistance device according to claim 1, wherein the prediction model is a supervised learning model.

10. The driving assistance device according to claim 7, wherein the deviation model is an unsupervised learning model.

11. The driving assistance device according to claim 1, further comprising a notification unit for notifying a driver of the own vehicle that a speed of the own vehicle is being controlled.

* * * * *